US012289219B2

(12) United States Patent
Adetunji et al.

(10) Patent No.: US 12,289,219 B2
(45) Date of Patent: Apr. 29, 2025

(54) SYSTEM AND METHOD FOR CONFIGURING A DEVICE THROUGH AN EMAIL/SMS

(71) Applicant: Adeia Media Holdings LLC, San Jose, CA (US)

(72) Inventors: Akinbola Adetunji, Milton (CA); Yannick Boulanger, Cantley (CA); Mokshada Shivarekar, Niagara Falls (CA)

(73) Assignee: Adeia Media Holdings LLC, San Jose, CA (US)

( * ) Notice: Subject to any disclaimer, the term of this patent is extended or adjusted under 35 U.S.C. 154(b) by 496 days.

(21) Appl. No.: 17/854,775

(22) Filed: Jun. 30, 2022

(65) Prior Publication Data

US 2024/0007361 A1    Jan. 4, 2024

(51) Int. Cl.
*H04L 41/28*      (2022.01)
*G06F 16/955*     (2019.01)
*H04L 9/40*      (2022.01)

(52) U.S. Cl.
CPC .......... *H04L 41/28* (2013.01); *G06F 16/9558* (2019.01); *H04L 63/08* (2013.01); *H04L 63/18* (2013.01); *H04L 2463/082* (2013.01)

(58) Field of Classification Search
CPC . G06F 16/9558; H04L 41/0806; H04L 41/28; H04L 63/18; H04L 63/08; H04L 41/026; H04L 2463/082

USPC ............................................................ 726/3
See application file for complete search history.

(56) References Cited

U.S. PATENT DOCUMENTS

| | | | |
|---|---|---|---|
| 8,731,539 B2 * | 5/2014 | Lin | H04W 24/02 455/418 |
| 8,787,182 B2 | 7/2014 | Garcia | |
| 10,110,416 B2 | 10/2018 | Campbell et al. | |
| 10,805,291 B2 | 10/2020 | Lee | |
| 10,841,151 B2 * | 11/2020 | Costa Perez | H04L 41/0883 |
| 11,109,201 B2 * | 8/2021 | Jahr | H04W 12/04 |
| 2011/0319056 A1 | 9/2011 | Toy et al. | |
| 2020/0153833 A1 | 5/2020 | Rosenblum et al. | |

* cited by examiner

*Primary Examiner* — Benjamin A Kaplan
(74) *Attorney, Agent, or Firm* — Haley Guiliano LLP

(57) ABSTRACT

A system and computer-implemented method for configuring one or more customer premise equipment via one or more electronic messages is provided. The system and computer-implemented method comprising a database for inputting a plurality of credentials connected to a cloud computing infrastructure via one or more network application programming interfaces. A specific unique identifier for linking the plurality of credentials to the user. One or more electronic messages containing a hyperlink coupled to the unique identifier and the linked plurality of credentials for configuring the one or more customer premise equipment and one or more instructions provided at the hyperlink to the user for configuring the one or more customer premise equipment using the linked plurality of credentials.

8 Claims, 2 Drawing Sheets

SYSTEM AND METHOD FOR CONFIGURING A DEVICE THROUGH AN EMAIL/SMS

FIELD OF THE INVENTION

The present disclosure relates to customer premise equipment configuration, more specifically, but not by way of limitation, more particularly to a system and method for straightforward configuration of one or more customer premise equipment (CPE) for a user through one or more electronic messages.

BACKGROUND

Any discussion of the related art throughout the specification should in no way be considered as an admission that such related art is widely known or forms part of common general knowledge in the field.

Setting up networks can often be as simple as Plug-N-Play or complex requiring specialized skill sets. Partners and end customer appreciate fast service turn up with no complexity, however, most experience the opposite.

Turn up of a service starts by configuration. The completed configuration is then pushed to the device, which is referred to as provisioning. Challenges occur after configuration, during provisioning and device connectivity creating for a poor experience. A few of such challenges are as follows:

How to connect the device properly?
Are the right credentials entered for provisioning to happen (accurate serial number or mac address)?
Has the right device been shipped to the appropriate address?
Is the device successfully configured?

What can be noticed from the list above is more to do with the unit when it is at the site ready for turn up, which are not overly technical. There is a lot that needs to be done in configuration upfront, and a short guided step when unit is at site waiting for turn up.

It is clear that there exists a need for a method and system for straightforward configuration of one or more customer premise equipment (CPE) for a user through one or more electronic messages.

BRIEF SUMMARY

It is an object of the invention to provide a system and method for configuration of one or more customer premise equipment (CPE) for a user through one or more electronic messages.

In accordance with an aspect of the invention, there is provided a computer-implemented method for configuring one or more customer premise equipment via one or more electronic messages comprising inputting, by a user, a plurality of credentials to a database connected to a cloud computing infrastructure via one or more network application programming interfaces. Linking the plurality of credentials to a specific unique identifier and the user. Sending the one or more electronic messages, the one or more electronic messages containing a hyperlink coupled to the unique identifier and the linked plurality of credentials. Selecting, by the user, the hyperlink for configuring the one or more customer premise equipment and configuring the one or more customer premise equipment using the linked plurality of credentials and one or more instructions provided at the hyperlink.

In accordance with another aspect of the invention, there is provided a system for configuring one or more customer premise equipment via one or more electronic messages comprising a database for inputting, by a user, a plurality of credentials connected to a cloud computing infrastructure via one or more network application programming interfaces. A specific unique identifier for linking the plurality of credentials to the user. One or more electronic messages containing a hyperlink coupled to the unique identifier and the linked plurality of credentials for configuring, by the user, the one or more customer premise equipment and one or more instructions provided at the hyperlink to the user for configuring the one or more customer premise equipment using the linked plurality of credentials.

In accordance with an embodiment of the invention, the plurality of credentials includes one or more of a site name, a site address, a public internet protocol (IP) subnet, a firewall support status, a dynamic host configuration protocol (DHCP) server status and an application prioritization.

In accordance with an embodiment of the invention, the hyperlink is a MAGIC LINK.

In accordance with an embodiment of the invention, the one or more customer-provided equipment is configured using the linked plurality of credentials via a wide area network link (WANX) coupled to the Internet.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The details of one or more embodiments of the subject matter of this specification are set forth in the accompanying drawings and the description below. Other features, aspects, and advantages of the subject matter will become apparent from the description, the drawings, and the claims.

Like reference numbers and designations in the various drawings indicate like elements.

Figure 1:
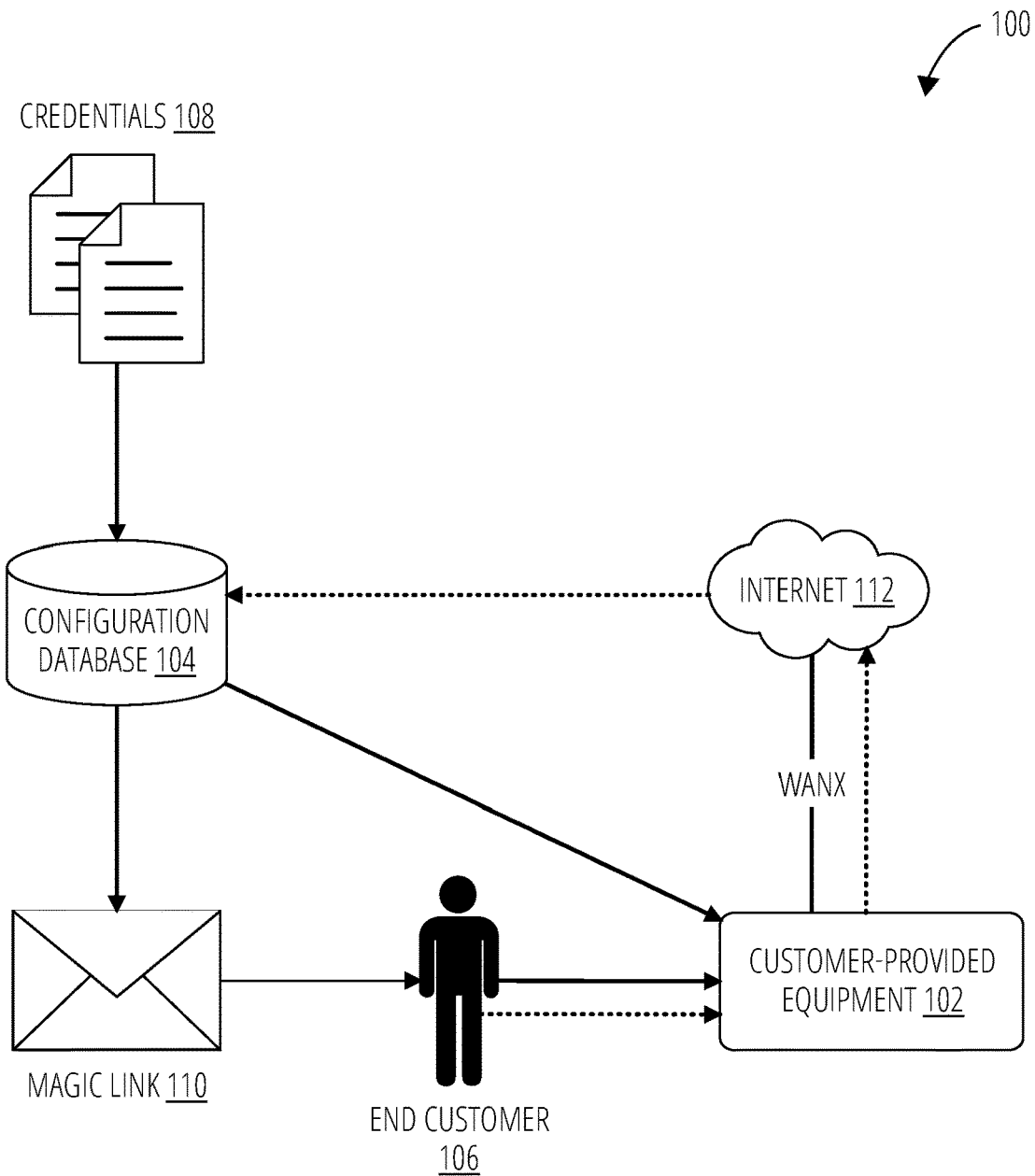
FIG. 1 illustrates an aspect of the subject matter in accordance with one embodiment.

FIG. 1 illustrates a high-level view 100 of a system for configuring one or more customer premise equipment (CPE), shown as customer-provided equipment 102, via one or more electronic messages according to some embodiments. The system is shown comprising a configuration database 104 for inputting, by an end customer 106 or partner, a plurality of credentials 108 connected to a cloud computing infrastructure via one or more network application programming interfaces (APIs). Configuration of the customer-provided equipment 102 is created using the network APIs and the plurality of credentials 108 may include, but is not limited to site name, site address, public internet protocol (IP) subnet, firewall support status, dynamic host configuration protocol (DHCP) server status and application prioritization.

Moreover, one or more electronic messages contain a hyperlink, referred to as a MAGIC LINK 110, coupled to a unique identifier and the linked plurality of credentials 108 for configuring, by the end customer 106, the one or more customer-provided equipment 102. MAGIC LINKs 110 are a one-time use link sent to the customer during the authentication process and the specific unique identifier is utilized for linking the plurality of credentials 108 to the end customer 106. Furthermore, one or more instructions are provided at the hyperlink to the end customer 106 for configuring the one or more customer-provided equipment 102 using the linked plurality of credentials 108 via a wide area network link (WANX) through the internet 112.

Figure 2:
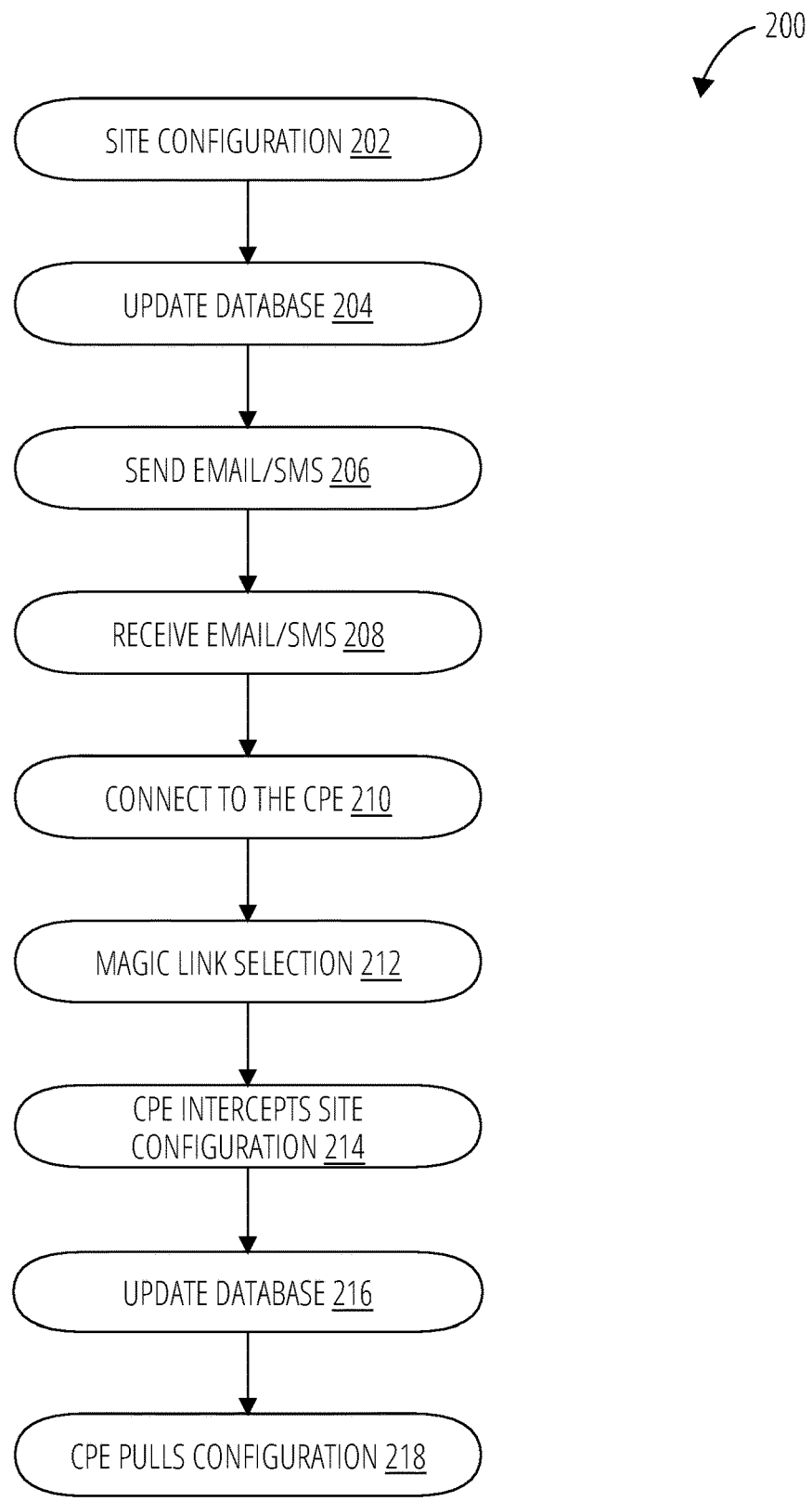
FIG. 2 illustrates an aspect of the subject matter in accordance with one embodiment.

FIG. 2 illustrates a workflow diagram 200 of a method for configuring one or more CPE via one or more electronic messages, according to some embodiments.

All configuration is done and saved into the configuration database 104. There is the option to pair a configuration to a device through serial number or MAC address or a unique identifier during configuration. Alternatively, this solution looks at pairing the configuration to a particular site and attaching the device to configuration during the actual site install. The concept is as follows:

Site configuration 202—Configuration is created using the network APIs. Configuration may include one or more of the site name, the site address, a Magic link, the public IP subnet, firewall support, DHCP Server information, DHCP server configuration, application prioritization, etc.

Update database 204—The site configuration 202 is pushed into the configuration database 104 along with a unique identifier called MAGIC LINK 110.

Send email/SMS 206—An email or SMS (Short Message Service) is sent to the personnel responsible for installing the customer-provided equipment 102. This email/SMS contains the site address and a clickable uniform resource locator (URL) that is attached to the unique identifier for the site within the configuration database 104.

Receive email/SMS 208—The personnel or end customer 106 receives the email in their inbox.

Connect to the CPE 210—The personnel or end customer 106 connects the customer-provided equipment 102 according to a Quickstart guide. Default configuration on the customer-provided equipment 102 is all wide area network (WAN) interfaces are set to DHCP client, local area network (LAN)/Wi-Fi interface set as DHCP server, any device connected to Wi-Fi or LAN will get an IP and is able to browse to the Internet 112. Connection is limited to 1 Mbps UP/Down per connected device. Restriction to be removed after provisioning.

MAGIC link selection 212—The personnel or end customer 106 opens email/SMS with MAGIC LINK 110 and clicks on the link for the site.

CPE intercepts site configuration 214—The customer-provided equipment 102 intercepts the http request and injects, Public IP addresses for all WAN interfaces, serial number and MAC address. The API updates the configuration for the site with the public IP addresses for all WAN interfaces, serial number and MAC address.

Update database 216—The customer-provided equipment 102 updates the configuration database 104 after intercepting the configuration for the site.

CPE pulls configuration 218—The customer-provided equipment 102 then pulls the configuration from the configuration database 104 and configures itself and comes online.

The foregoing descriptions of specific embodiments of the present invention have been presented for purposes of illustration and description. They are not intended to be exhaustive or to limit the invention and method of use to the precise forms disclosed. Obviously, many modifications and variations are possible in light of the above teaching. As can be understood, the examples described above are intended to be exemplary only.

The embodiments described were chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient but is intended to cover the application or implementation without departing from the spirit or scope of the claims of the present invention.

The term "connected", "attached", "affixed" or "coupled to" may include both direct coupling (in which two elements that are coupled to each other contact each other) and indirect coupling (in which at least one additional element is located between the two elements).

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A computer-implemented method for configuring one or more customer premise equipment via one or more electronic messages comprising:
   inputting, by a user, a plurality of credentials to a database connected to a cloud computing infrastructure via one or more network application programming interfaces;
   linking said plurality of credentials to a specific unique identifier and said user;
   sending said one or more electronic messages, said one or more electronic messages containing a hyperlink coupled to said unique identifier and said linked plurality of credentials;
   selecting, by said user, said hyperlink for configuring said one or more customer premise equipment; and
   configuring said one or more customer premise equipment using said linked plurality of credentials and one or more instructions provided at said hyperlink.

2. The computer-implemented method of claim 1, wherein said plurality of credentials includes one or more of a site name, a site address, a public internet protocol (IP) subnet, a firewall support status, a dynamic host configuration protocol (DHCP) server status and an application prioritization.

3. The computer-implemented method of claim 1, wherein said hyperlink is a MAGIC LINK.

4. The computer-implemented method of claim 1, wherein said one or more customer-provided equipment is configured using said linked plurality of credentials via a wide area network link (WANX) coupled to the Internet.

5. A system for configuring one or more customer premise equipment via one or more electronic messages comprising:
   a database for inputting, by a user, a plurality of credentials connected to a cloud computing infrastructure via one or more network application programming interfaces;

a specific unique identifier for linking said plurality of credentials to said user;

one or more electronic messages containing a hyperlink coupled to said unique identifier and said linked plurality of credentials for configuring, by said user, said one or more customer premise equipment; and one or more instructions provided at said hyperlink to said user for configuring said one or more customer premise equipment using said linked plurality of credentials.

6. The system of claim 5, wherein said plurality of credentials includes one or more of a site name, a site address, a public internet protocol (IP) subnet, a firewall support status, a dynamic host configuration protocol (DHCP) server status and an application prioritization.

7. The system of claim 5, wherein said hyperlink is a MAGIC LINK.

8. The system of claim 5, wherein said one or more customer-provided equipment is configured using said linked plurality of credentials via a wide area network link (WANX) coupled to the Internet.

* * * * *